United States Patent
Herrmann et al.

(10) Patent No.: US 7,406,383 B2
(45) Date of Patent: Jul. 29, 2008

(54) METHOD OF ESTIMATING THE ILLUMINATION FOLD IN THE MIGRATED DOMAIN

(75) Inventors: Philippe Herrmann, Villepreux (FR); Nicolas Bousquie, Longpont sur Orge (FR)

(73) Assignee: Compagnie Generale de Geophysique, Massy (FR)

( * ) Notice: Subject to any disclaimer, the term of this patent is extended or adjusted under 35 U.S.C. 154(b) by 0 days.

(21) Appl. No.: 10/565,403

(22) PCT Filed: Jul. 20, 2004

(86) PCT No.: PCT/IB2004/002618
§ 371 (c)(1),
(2), (4) Date: Apr. 13, 2006

(87) PCT Pub. No.: WO2005/008292
PCT Pub. Date: Jan. 27, 2005

(65) Prior Publication Data
US 2006/0190179 A1  Aug. 24, 2006

(30) Foreign Application Priority Data
Jul. 21, 2003 (FR) .................................. 03 08862

(51) Int. Cl.
*G01V 1/28* (2006.01)
(52) U.S. Cl. ....................................................... 702/14
(58) Field of Classification Search .................... 702/14, 702/17, 18
See application file for complete search history.

(56) References Cited

U.S. PATENT DOCUMENTS

| 5,530,646 A | 6/1996 | Schoen |
| 6,577,955 B2 * | 6/2003 | Guillaume .................... 702/14 |
| 6,665,618 B1 * | 12/2003 | Thomas et al. ................ 702/14 |

FOREIGN PATENT DOCUMENTS

WO    WO95/15506    6/1995

OTHER PUBLICATIONS

Bleistein, N., "On the Imaging of Reflectors in the Earth", Geophysics, vol. 52, No. 7, Jul. 1, 1987, pp. 931-942, XP002095154.
Bleistein, N., "True-Amplitude Transformation to Zero Offset of Data from Curved Reflectors", Geophysics, vol. 64, No. 1, Jan. 1, 1999, pp. 112-129, XP002276525.

* cited by examiner

*Primary Examiner*—Donald E McElheny, Jr.
(74) *Attorney, Agent, or Firm*—David M. Ostfeld

(57) ABSTRACT

The invention relates to an estimate of the seismic illumination fold (x, p) in the migrated 3D domain at an image point x, for a dip of vector p characterized in that the illumination fold I (z, p; s, r) is estimated for each (source s, receiver r) pair in the seismic survey, by applying the following steps:—determination of the reflection travel time $t_r(\cdot x_r(p);s\cdot r)$ from the source s to the specular reflection point z, on the plane reflector passing through the image point x and perpendicular to the dip vector p, and then return to the reflector r; starting from the diffraction travel time $t_d(\cdot z;s\cdot r)$ from the source to the said image point x and then return to the reflector r;—incrementing the said illumination fold I (X, p; s, r) related to the said (source s, receiver r) pair as a function of the difference between the diffraction travel time $t_d(x;s,r)$ and the reflection travel time tr(xr(p)issr).

21 Claims, 3 Drawing Sheets

For each (source $\vec{s}$, receiver $\vec{r}$) pair involved in the migration.

For each image point $\vec{x}$ in the migrated domain.

1 — For each dip component $\vec{p}$ selected for the illumination calculation $I(\vec{x}, \vec{p}, \vec{s}, \vec{r})$.

2 — Determine the reflection travel time $t_r(\vec{x_r}(\vec{p}); \vec{s}, \vec{r})$ at the specular reflection point $\vec{x_r}$ on the plane reflector passing through the image point $\vec{x}$ and perpendicular to the dip vector $\vec{p}$.

3 — Increment the illumination fold $I(\vec{x}, \vec{p}, \vec{s}, \vec{r})$ relative to the (source $\vec{s}$, receiver $\vec{r}$) pair as a function of the difference between:
the diffraction travel time $(t_d(\vec{x}; \vec{s}, \vec{r})$ and
the reflection travel time $t_r(\vec{x_r}(\vec{p}); \vec{s}, \vec{r})$.

FIG.4

METHOD OF ESTIMATING THE ILLUMINATION FOLD IN THE MIGRATED DOMAIN

CROSS-REFERENCE TO RELATED APPLICATIONS

This patent application is filed under 35 U.S.C. §371 as the national phase of International Application No. PCT/IB04/02618 filed Jul. 20, 2004 which claims priority to French Application No. 0308862 filed Jul. 21, 2003.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The field of the invention is seismic prospecting. The invention relates to seismic imagery and more particularly to estimating the illumination fold in the migrated 3D domain necessary to obtain a high resolution image of the underground structure at true amplitude.

2. Description of Related Art

Seismic prospecting generally consists of emitting seismic waves into the sub-soil using one or several seismic sources, and recording seismic data corresponding to seismic waves reflected on geological interfaces in the sub-soil (also called reflectors) on the ground surface, as a function of time, using receivers (also called geophones or hydrophones depending on whether the survey is being made on land or at sea) and then processing these data to extract useful information about the geology of the sub-soil.

Data processing (or seismic traces) recorded by receivers are useful particularly for designing images with information about the geology of the sub-soil.

BRIEF SUMMARY OF THE INVENTION

The objective of high resolution seismic imagery with true amplitude is to provide an image of the sub-soil that is not disturbed, particularly by wave field propagation effects in the sub-soil and by acquisition effects (we then talk about acquisition patterns).

Acoustic reflectivity of the sub-soil is represented as an image using a so-called migration method to restore correct forms of geological interfaces. To achieve this, seismic data are converted from the domain in which they are acquired to the migrated domain in which geological interfaces are represented in their genuine locations.

In the migrated domain, the vertical scale may be time (we then talk about time migration) or depth (we then talk about depth migration).

Migration is usually done before summation (we then talk about pre-stack migration), with direct mapping of the seismic signal from seismic traces towards the migrated domain.

The precise identification of the sub-soil geology at a particular point is directly related to the capability of a seismic emission to illuminate this point. If a point in the sub-soil is highly illuminated, in all likelihood the seismic survey can evaluate the geology of the sub-soil at this point. On the other hand, if a point of the sub-soil is not well illuminated, it is quite possible that the seismic survey will provide an imprecise or even incorrect evaluation of the sub-soil geology at this point.

In order to obtain a precise representation of the sub-soil, the true amplitudes of the reflection of the seismic wave on a reflector must be represented perfectly.

Therefore, it is necessary to know precisely if a change in the amplitude at a specific point in the sub-soil is the result of a change in the geology of the sub-soil at this point or if it is the result of a particular illumination at this point.

But reflectors are usually illuminated non-uniformly. In particular, the illumination depends on:

the configuration of seismic data acquisition;
lateral and vertical variations of the propagation velocity of seismic waves in the sub-soil.

In order to obtain a high resolution image of the reflectivity of the sub-soil, it is necessary to make an amplitude correction to take account of non-uniformity of illumination of reflectors when migrating seismic reflections.

As has already been described above, this correction (done using a weighting factor) is necessary because:

the reflectivity of the sub-soil cannot be precisely imaged without correcting amplitude distortions related to propagation of the wave field in the sub-soil (spherical divergence, absorption, directivity, etc.);
to improve the resolution of the reflectivity image, it is important to take account of the variability of the migration illumination fold for each inclination of a reflector used during the migration.

For a given image point in the migrated domain, the illumination fold corresponds to the number of source-receiver pairs for which contributions for building up the amplitude of the reflectivity image interfere constructively (stationary phase condition).

The document "Bleistein, N. 1987, On the Imaging of Reflectors in the Earth: Geophysics Soc. of Expl. Geophysics, 931-942" proposes a method used to obtain an amplitude weighting factor for a regular acquisition configuration, capable of making a high resolution representation of the reflectivity of the sub-soil in true amplitude.

This is an "inverse" method composed of a modelling step (modelling of seismic traces from a reflectivity model) followed by a migration step (from modelled seismic traces to imaged reflectivity), the weighting factor then being chosen so as to obtain perfect agreement between the imaged reflectivity and the reflectivity model.

By following this "inverse" method proposed by Bleistein and as shown in FIG. 1, it can be seen that:

for a given acquisition configuration (distribution of (source S, receiver R) pairs),
for a given image point $\bar{x}$ in the migrated domain,
for a given reflector inclination (indicated by a dip vector $\bar{p}$), the illumination fold $I(\bar{x},\bar{p})$ is determined by the number of source-receiver pairs such that their migration contributions constructively interfere with the image of the dip reflector $\bar{p}$ at the image point $\bar{x}$.

Expressions developed by Bleistein for the illumination fold $I(\bar{x},\bar{p})$ include the effect of the entire geometric configuration of the acquisition in a single step.

Consequently, the method proposed by Bleistein can only be used for a regular and parametric distribution of all source-receiver pairs.

Consequently, this restrictive application condition limits its use to a small number of acquisition configurations.

Therefore for acquisition configurations with irregular geometries, it is necessary to define individual illumination folds $I(\bar{x},\bar{p},\bar{s},\bar{r})$, for each (source $\bar{s}$, receiver $\bar{r}$) pair involved in the migration. Obviously, the said individual ratios contribute to the total illumination fold $I(\bar{x},\bar{p})$ according to $$I(\bar{x}, \bar{p}) = \sum_{\bar{s},\bar{r}} I(\bar{x}, \bar{p}, \bar{s}, \bar{r})).$$

However, the study carried out by Bleistein is based on a number of developments that were intended to estimate the illumination fold in the migrated domain for any geometric acquisition configuration, and for any distribution of the source receiver pairs.

For years, various approximations have been proposed for the seismic wave that is the key element for estimating the stationary phase condition (constructive interference condition).

The first developments consisted of modeling specular reflection points along a horizon (2D map) selected in the migrated domain (3D) by ray tracing for each of the (source $\bar{s}$, receiver $\bar{r}$) pairs.

This reflection modelling step determines the following quantities:

location of reflection points $\bar{x}_r(\bar{s},\bar{r})$ along the selected horizon;

the specular reflection travel time $t_r(\bar{x};\bar{s},\bar{r})$;

The diffraction travel time $t_d$ along the selected horizon can then be estimated by a development of the reflection travel time $t_r$, around the specular reflection point $\bar{x}_r(\bar{s},\bar{r})$ in the Taylor series (determination of first and second derivatives, $\nabla_x t_r(\bar{x}_r)$ and $\nabla_{x,x} t_r(\bar{x}_r)$).

FIG. 2 illustrates this procedure during which the diffraction travel time $t_d(\bar{x})$ at image point $\bar{x}$ is estimated using the reflection travel time $t_r(\bar{x}_r)$ and more particularly by its development around the specular reflection point $\bar{x}_r$ in the Taylor series.

Summation of all wavelet mappings obtained for each source-receiver pair then provides a means of estimating the illumination fold in the migrated domain along the selected horizon.

By modelling the seismic wavelet according to a pulse peak, with infinite frequency band, document "Cain, G., Cambois, G., Gehin, M and Hall, R., 1998 Reducing risk in seismic acquisition and interpretation of complex targets using a Gocad-based 3-D modeling tool, 68th Ann. Internat. Mtg, Soc. of Expl. Geophys., 2072-2075" has shown that an impact map can be obtained, and in this case only the specular contribution on a selected horizon is actually taken into account.

Considering a realistic approximation of a seismic wavelet with limited band, the following documents:

"Schneider, W., Jr and Winbow, G., 1999, Efficient and accurate modelling of 3D seismic illumination, 69th Ann. Internat. Mtg, Soc. Of Expl. Geophys, Expanded Abstract, 633-636";

"Laurain, R. and Vinje, V. 2001, Pre-stack migration and illumination maps, 71th Ann. Internat., Mtg: Soc. Of Expl. Geophys, Expanded Abstract, 929-932"; have shown that it is possible to improve estimating the illumination fold along selected horizons.

These approaches, in particular based on scanning of selected horizons, have been found to be reliable and precise. However, their efficiency is limited particularly due to the fact that:

compensation for the illumination fold is limited to a finite number of selected horizons and therefore, unlike the method developed by Bleistein, this method is not completely 3D;

for each (source $\bar{s}$, receiver $\bar{r}$) pair involved in the migration, a dedicated modelling step must be carried out after the migration. However, this modelling step to determine the $(\bar{x}_r, \nabla_x t_r, \Delta_{x,x} t_r)$ quantities mentioned previously by ray tracing along each of the selected horizons is particularly expensive in terms of time.

In order to overcome these limitations, and in order to approximate a 3D approach, a two-step solution has been proposed to estimate and then to compensate for the illumination ratio, and particularly in documents:

"Albertin U., Bloor, R., Beasley, C., Chang, W., Jaramillo, H., Mobley, E. and Yingst, D., 1999, Aspects of true amplitude migration, 69th Ann. Internat. Mtg: Soc. Of Expl. Geophys, Expanded Abstract, 1247-1250";

"Audebert, F., Froidevaux, P. Haurd, I., Nicoletis, L. and Svay-Lucas, J., 2000, A multi angle toolbox for restored amplitude images and AVA gathers, 70th Ann. Internat. Mtg: Soc. Of Expl. Geophys, Expanded Abstract, 1020-1023".

The first step consists of making an analysis of the multi-dip illumination fold using predetermined tables for Kirchhoff migration for diffraction travel times $t_d(\bar{x};\bar{s},\bar{r})$, in the migrated domain.

In the second step, the inverse values of the estimated illumination folds are used to make the weighted summation of seismic data.

For each image point $\bar{x}$ and for an entire reflector dip range $\bar{p}$, it has been proposed to increment an illumination occurrence counter $I(\bar{x},\bar{p})$ every time that a migration contribution reaches the image point $\bar{x}$ with the dip component $\bar{p}$.

In a manner similar to that proposed by Cain et al (see above), the criterion used to increase the illumination occurrence counter takes account of a pulse model of the seismic wavelet, with infinite frequency band.

This high frequency approximation is such that for a given dip component, only specular migration contributions corresponding to the said dip component are used for estimating the illumination.

And there are a number of limitations to this high frequency approximation:

the estimated illumination is biased since the limited band nature of the seismic signal is ignored;

in order to avoid division by zeros, the illumination folds are stored by dip classes. However, the size of each class is a critical element. If the class size is too small, risks of numerical instability are very high; if the class size is too large, the precision of the estimated illumination coverage is low.

The invention is designed to provide a method for estimating the seismic illumination fold in the migrated 3D domain that is not subject to these limitations.

More precisely, the purpose of the invention is to propose a method that takes account of the limited band nature of the seismic signal in order to estimate more realistic illumination folds, and which at the same time solves the problem of the class size.

Consequently, according to a first aspect of the invention, it divulges a method for estimating the seismic illumination fold $I(\bar{x},\bar{p})$ in the migrated 3D domain at an image point $\bar{x}$ for a dip of vector $\bar{p}$, characterized in that it estimates the illumination fold $I(\bar{x},\bar{p},\bar{s},\bar{r})$ for each (source $\bar{s}$, receiver $\bar{r}$) pair in the seismic survey, by applying the following steps:

- determination of the reflection travel time $t_r(\bar{x}_r(\bar{p});\bar{s}\bar{r})$ from the source $\bar{s}$ to the specular reflection point $\bar{x}_r$ on the plane reflector passing through the image point x and perpendicular to the dip vector $\bar{p}$ and then return to the reflector $\bar{r}$;
- starting from the diffraction travel time $t_d(\bar{x};\bar{s},\bar{r})$ from the source $\bar{s}$ to the said image point $\bar{x}$ and then return to the reflector $\bar{r}$;
- incrementing the said illumination fold $I(\bar{x},\bar{p},\bar{s},\bar{r})$ related to the said (source $\bar{s}$, receiver $\bar{r}$) pair as a function of the difference between the diffraction travel time $t_d(\bar{x};\bar{s},\bar{r})$ and the reflection travel time $t_r(\bar{x}_r(\bar{p});\bar{s}\bar{r})$.

Preferred but non-limitative aspects of the method according to the first aspect of the invention are as follows:

the method also comprises a step to summate each illumination fold $I(\bar{x},\bar{p},\bar{s},\bar{r})$ related to a (source $\bar{s}$, receiver $\bar{r}$) pair so as to determine the total illumination fold $$I(\bar{x}, \bar{p}) = \sum_{\bar{s},\bar{r}} I(\bar{x}, \bar{p}, \bar{s}, \bar{r}),$$

during the increment step, the illumination fold $I(\bar{x},\bar{p},\bar{s},\bar{r})$ may be incremented using an increment function $i(t_d,t_r;\bar{s},\bar{r})$ using the equation $I(\bar{x},\bar{p},\bar{s},\bar{r})=I(\bar{x},\bar{p},\bar{s},\bar{r})+i(t_d,t_r;\bar{s},\bar{r})$, the increment function i may be a function of the seismic wavelet s(t), the increment function i may be expressed as a function of the derivative of the seismic wavelet with respect to time, it is envisaged that an a priori correction $w(\bar{x},\bar{s},\bar{r})$ of the illumination fold could be taken into account, which usually has to be considered during migration, the determination step includes the second order Taylor series development of the diffraction travel time $t_d(\bar{x};\bar{s},\bar{r})$ around the image point $\bar{x}$, the specular reflection point $\bar{x}_r(\bar{p})$ is determined along the length of the said reflector such that the diffraction travel time at the said specular reflection point $\bar{x}_r(\bar{p})$ is stationary, the determination step uses isochronic migration maps $t_d(\bar{x};\bar{s},\bar{r})$ specified for each (source $\bar{s}$, receiver $\bar{r}$) pair involved in the migration and each image point $\bar{x}$ in the migrated 3D domain, the seismic illumination fold $I(\bar{x},\bar{p})$ in the migrated 3D domain is estimated during the Kirchhoff summation migration of seismic data recorded during the 3D seismic prospecting.

According to another aspect, the invention proposes a method for correction of seismic data amplitudes recorded during a 3D seismic survey in order to compensate for the effect of non-uniform illumination of sub-soil reflectors, characterized in that it comprises steps consisting of:

estimating the illumination fold $I(\bar{x},\bar{p})$ using the method according to the first aspect of the invention, using the inverse $I^{-1}(\bar{x},\bar{p})$ of the said ratio as a weighting factor to be applied to each of the said seismic data amplitudes.

According to another aspect, the invention proposes a method for selection of acquisition geometry among a plurality of acquisition geometries as a function of the target of 3D seismic prospecting, characterised in that it consists of the following steps:

determining the illumination fold $I(\bar{x},\bar{p})$ by the method according to the first aspect of the invention, for each of the acquisition geometries considered, selecting the acquisition geometry providing the optimum illumination fold as a function of the target.

BRIEF DESCRIPTION OF THE SEVERAL VIEWS OF THE DRAWINGS

Other aspects, purposes and advantages of the invention will become clearer after reading the following detailed description of a preferred embodiment of it, given as a non-limitative example with reference to the attached drawings on which:

FIG. 4 is a flowchart diagrammatically showing the main steps in the method according to the invention.

DETAILED DESCRIPTION OF THE INVENTION

The invention proposes a method of estimating the illumination fold in the migrated domain $I(\bar{x},\bar{p};\bar{s},\bar{r})$ for any migrated position $\bar{x}$, regardless of its dip component $\bar{p}$ and regardless of the distribution of seismic traces, using only the most basic quantities involved in migration by a Kirchhoff summation, namely:

the coordinates $(\bar{s},\bar{r})$ of source-receiver pairs, where $\bar{s}$ represents the position of a source $\bar{S}$ and $\bar{r}$ represents the position of a receiver R;* migration isochronic maps td $(\bar{x};\bar{s},\bar{r})$ for each of the (source $\bar{s}$, receiver $\bar{r}$) pairs involved in the migration.

The invention is equally applicable to imagery in time and imagery in depth.

The invention divulges a method of the type including a modelling step followed by a migration step.

Concerning the modelling step of the reflection point $\bar{x}$ and the reflection travel time $t_r(\bar{x}_r)$, the method according to the invention applies the stationary phase condition to a Taylor series development of diffraction travel times $t_d(\bar{x})$.

The said development is a second order development.

Concerning the migration step, the method according to the invention uses isochronic migration maps available for the migration conventionally done by a Kirchhoff summation.

Figure 1:
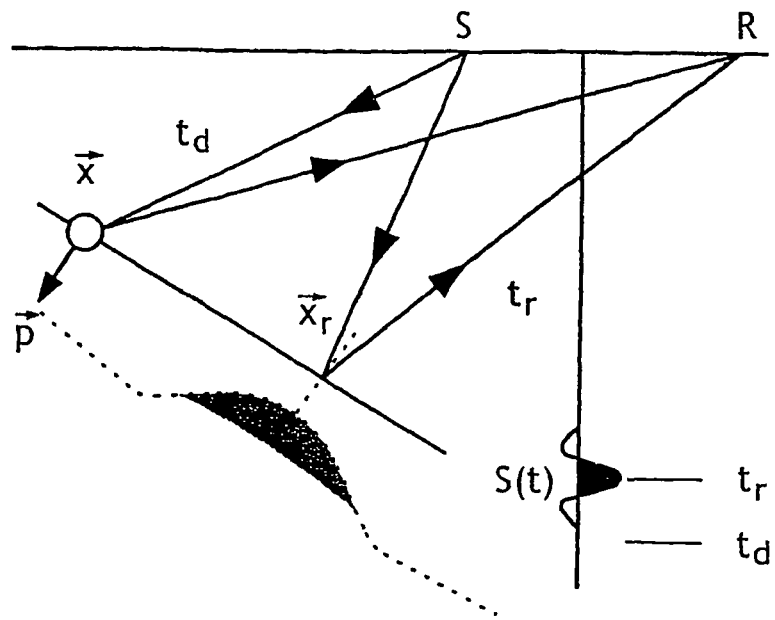
FIG. 1, already commented, illustrates the constructive or non-constructive contribution as a function of $s(t_d-t_r)$, of the seismic trace migrated to the image of the reflector with a dip along $\bar{x}$.
Figure 2:
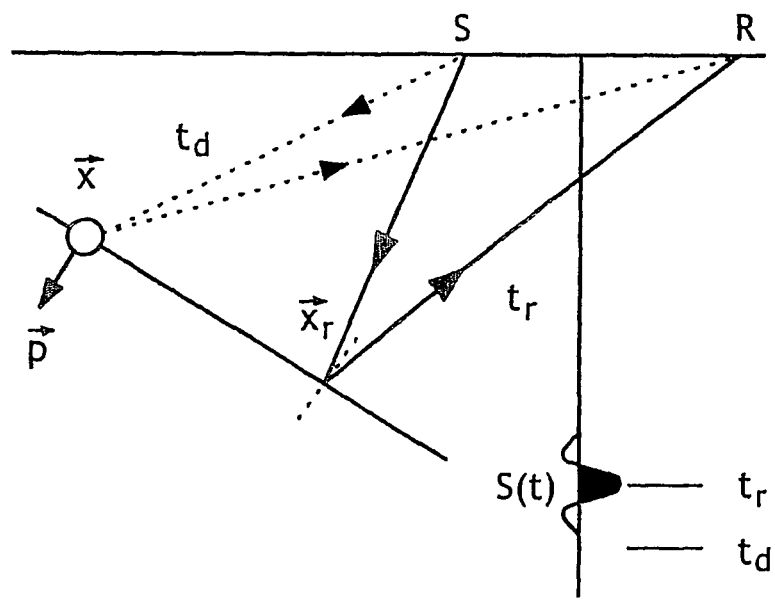
FIG. 2, already commented, illustrates the estimate made according to the state of the art for the diffraction travel time at the image point $t_d(\bar{x})$ starting from a Taylor series development of the reflection travel time at the specular reflection point $t_r(\bar{x}_r)$.
Figure 3:
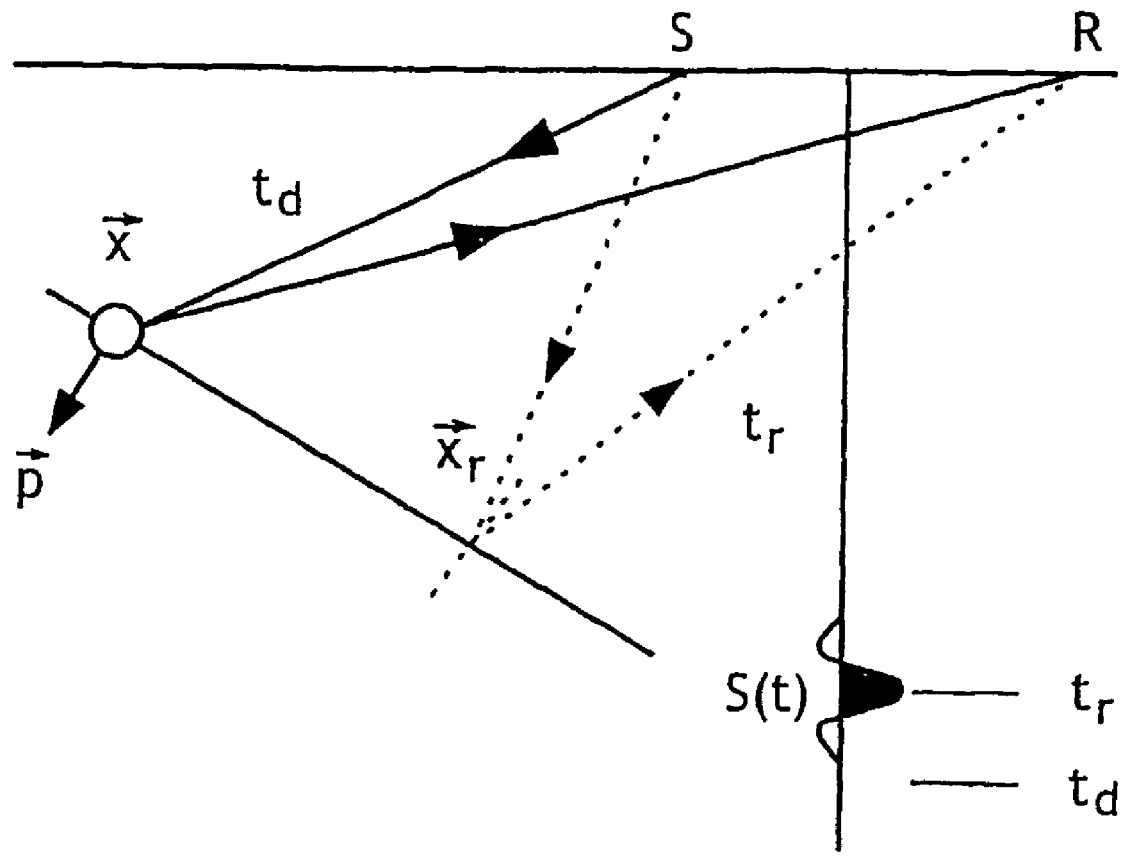
FIG. 3 illustrates the method according to the invention according to which the specular reflection point $\bar{x}$ is estimated, together with the reflection travel time $t_r(\bar{x}_r)$ starting from a Taylor series development of the diffraction travel time at the image point $t_d(\bar{x})$.

For each of the (source $\bar{s}$, receiver $\bar{r}$) pairs, the illumination fold $I(\bar{x},\bar{p};\bar{s},\bar{r})$ is updated with reference to FIG. 3 using the following equation:

$$I(\bar{x},\bar{p};\bar{s},\bar{r})=I(\bar{x},\bar{p};\bar{s},\bar{r})+I(td,tr;\bar{s},\bar{r}) \qquad \text{Equation (1)}$$

where
- $\bar{x}$ is the image point in the migrated domain $\bar{x}=(x_1,x_2,x_3)^T$;
- $\bar{p}$ is the dip vector representing the selected dip component, $\bar{p}=(p_1,p_2,p_3)^T$;
- $\bar{s}$ defines the coordinates of the source, $\bar{s}=(s_1,s_2,s_3)^T$
- $\bar{r}$ defines the coordinates of the receiver, $\bar{r}=(r_1,r_2,r_3)^T$
- $t_d(\bar{x};\bar{s},\bar{r})$ is the diffraction travel time from the source $\bar{s}$, as far as the migrated position $\bar{x}$, and return as far as the receiver $\bar{r}$ (path indicated by $t_d$ on FIG. 3 and shown in solid lines);
- $t_r(\bar{x}_r(\bar{p});\bar{s}\bar{r})$ is the reflection travel time from the source $\bar{s}$ as far as point $\bar{x}$ of specular reflection on the plane reflector passing through image point $\bar{x}$ and perpendicular to the dip vector $\bar{p}$, and return as far as the receiver $\bar{r}$ (path indicated by $t_r$ on FIG. 3 and shown in dashed lines);
- $I(t_d,t_r;\bar{s},\bar{r})$ is an increment function for which the expression will be described in detail below.

As already mentioned above, the method according to the invention advantageously uses isochronic migration maps $t_d(\bar{x};\bar{s},\bar{r})$ involved in the migration by Kirchhoff summation, for each of the (source $\bar{s}$, receiver $\bar{r}$) pairs involved in the migration. These maps are "input data" to the method according to the invention.

It also uses first and second derivatives $\nabla_x t_d(\bar{x};\bar{s},\bar{r}), \Delta_{x,x} t_d(\bar{x};\bar{s},\bar{r})$ of migration isochrones when they are available. If not, the said derivatives are not input data, but may be calculated as part of the method according to the invention.

FIG. 4 is a flow chart showing the different steps in the method according to a preferred embodiment of the invention.

The said method consists of carrying out a step 1 used for each image point $\bar{x}$ in the migrated 3D domain, for each of the (source $\bar{s}$, receiver $\bar{r}$) pairs involved in the migration.

The said step 1 includes two operations 2, 3, for each dip component $\bar{p}$ selected for the illumination calculation $I(\bar{x},\bar{p};\bar{s},\bar{r})$.

The first operation 2 consists of determining the reflection travel time $t_r(\bar{x}_r(\bar{p});\bar{s}\bar{r})$ to the specular reflection point $\bar{x}_r(\bar{p})$ on the plane reflector passing through the image point $\bar{x}$ and perpendicular to the dip vector $\bar{p}$.

Operation 2 is determined from the diffraction travel time $td(\bar{x};\bar{s},\bar{r})$ known from the isochronic migration maps.

The second operation 3 consists of incrementing the illumination fold in the migrated domain $I(\bar{x},\bar{p};\bar{s},\bar{r})$ of an increment function $I(t_d,t_r;\bar{s},\bar{r})$ the said increment function taking account of:
- the difference $\{t_d(\bar{x},\bar{s},\bar{r})-t_r(\bar{x}_r(\bar{p});\bar{s}\bar{r})\}$ between the travel times mentioned above;
- the seismic wavelet s(t);
- and possibly the migration amplitude term $w(\bar{x};\bar{s},\bar{r})$ At the end of operations 2 and 3, the illumination amplitude ratio $I(\bar{x},\bar{p};\bar{s},\bar{r})$ is known for a given image point $\bar{x}$ and a dip component $\bar{p}$.

By repeating the operations mentioned above for each of the (source $\bar{s}$, receiver $\bar{r}$) pairs, the final step is to determine the illumination ratio in the migrated domain $I(\bar{x},\bar{p})$ This is done by adding the relative illumination to each pair (source $\bar{s}$, receiver $\bar{r}$) according to $$I(\bar{x},\bar{p}) = \sum_{s,r} I(\bar{x},\bar{p};\bar{s},\bar{r}).$$

The reflection point $\bar{x}_r$ and the reflection travel time $t_r$ are determined (during operation 2 mentioned above) starting from a stationary phase analysis, by a second order Taylor series development of the diffraction travel time $t_d$ around the image point $\bar{x}$.

The following expressions for $\bar{x}_r$ and $t_r$ (equations (3) and (4)) are obtained from this analysis (see equation (2) below):

$$t_d(\bar{x};\bar{s},\bar{r}) = t_r((\bar{x};\bar{s},\bar{r}) + \qquad \text{Equation (2)}$$
$$(\nabla_x t_r)^T(\bar{x}-\bar{x}_r) + \frac{1}{2}(\bar{x}-\bar{x}_r)^T(\nabla_{x,x}t_r)(\bar{x}-\bar{x}_r) + \ldots$$

$$\bar{x}_r(\bar{p}) = \bar{x} - M \cdot F^{-1} \cdot \bar{b} \qquad \text{Equation (3)}$$

$$t_r(\bar{x}_r(\bar{p});\bar{s},\bar{r}) = t_d(\bar{x};\bar{s},\bar{r}) - \frac{1}{2} \cdot \bar{b}^T \cdot F^{-1} \cdot \bar{b} \qquad \text{Equation (4)}$$

where, in equations (3) and (4).
- M is a (3×2) matrix described as two vectors extending along the length of the reflection plane. Consequently, these two vectors are perpendicular to the dip vector $\bar{p}$.
- $\bar{b}$ is a (2×1) vector of the second order derivatives of the diffraction travel time along the reflection plane, $$\bar{b}=M^T \cdot \nabla_x t_d \qquad \text{Equation (5)}$$

F is a (2×2) matrix of first order derivatives of the diffraction travel time along the reflection plane, $$F=M^T(\Delta_{x,x}t_d)\cdot M \qquad \text{Equation (6)}$$

The following describes how equations (3) and (4) are obtained.

Note that the dip vector $\bar{p}$ represents the apparent dip of a reflector in the migrated domain, this reflector passing through the image point $\bar{x}$.

The dip vector p is expressed according to:

$$\bar{p}=(\partial x_3/\partial x_1, \partial x_3/\partial x_2, 1) \qquad \text{Equation (7a)}$$

where $\partial x_3/\partial x_1$ represents the apparent dip along the $x_1$ axis and $\partial x_3/\partial x_2$ represents the apparent dip along the $x_2$ axis.

$\theta$ and $\Psi$ represent the inclination and azimuth respectively of the dipped reflector passing through the image point $\bar{x}$ at which the illumination is evaluated.

Thus, the following expressions are obtained:

$$\cos\theta = (1+p_1+p_2)^{-1/2} \qquad \text{Equation (7b)}$$

$$\tan\Psi = p_2/p_1 \qquad \text{Equation (7c)}$$

As we have seen above, starting from the Taylor series development of the diffraction travel time (known from the isochronic migration map), the following equation is applicable:

$$t_d(\bar{x}_r) = \qquad \text{Equation (2)}$$
$$t_d(\bar{x}) + (\nabla_x t_d)^T(\bar{x}_r-\bar{x}) + \frac{1}{2}(\bar{x}_r-\bar{x})^T \cdot \Delta_{x,x} t_d \cdot (\bar{x}_r-\bar{x}) + \ldots$$

The reflection point $\bar{x}_r$ is firstly estimated along the reflection plane for which the diffraction travel time is stationary (condition for specular reflection).

In order to consider positions only belonging to the dipped plane, a new vector $\bar{x}_p$ is introduced such that:

$$\bar{x}_r = \bar{x} + M \cdot \bar{x}_p = \bar{x} + \begin{pmatrix} 1 & 0 \\ 0 & 1 \\ -p_1 & -p_2 \end{pmatrix} \begin{pmatrix} x_{p1} \\ x_{p2} \end{pmatrix} \quad \text{Equation (7d)}$$

Note that in this case, as required, the two vectors of the matrix M are actually perpendicular to the dip vector $\bar{p}$.

Rewriting equation (2) using equation (7d) gives the following expression:

$$t_d(\bar{x}_p) = \quad \text{Equation (7e)}$$
$$t_d(\bar{x}) + (\nabla_x t_d)^T M \cdot \bar{x}_p + \frac{1}{2} \cdot \bar{x}_p^T \cdot M^T \cdot \Delta_{x,x} t_d \cdot M \bar{x}_p^T + \ldots$$

namely $$T_d(\bar{x}_p) = T_d(\bar{x}) + \bar{b}^T \cdot \bar{x}_p + \frac{1}{2} \cdot \bar{x}_p^T \cdot F \bar{x}_p^T + \ldots \quad \text{Equation (7f)}$$

In this equation (7f)
$\bar{b}^T = (\nabla_x t_d)^T M$, where $\bar{b} = M^T \cdot (\nabla_x t_d)$ and $F = M^T \Delta_{x,x} t_d \cdot M$.

Consequently, the position $\bar{x}_{rp}$ for which the diffraction travel time $t_d(\bar{x}_p)$ is stationary is deduced:

$$\nabla_{x_p} t_d(\bar{x}_p)|xrp = \bar{0}_T \Rightarrow \bar{x}_{rp} = -F^{-1} \cdot \bar{b} \Rightarrow x_r = \bar{x} + M \bar{x}_{rp} \quad \text{Equation (7g)}$$

Equations (7g) and (2) are combined to obtain an expression for the reflection travel time in equation (4):

$$t_r = t_d(\bar{x}_r) \approx t_d(\bar{x}) - \frac{1}{2} \bar{b}^T \cdot F^{-1} \cdot \bar{b}.$$

As already mentioned, the illumination fold is incremented during operation 3 as a function of the difference between the diffraction travel time $t_d$ and the reflection travel time $t_r$.

Even if the reflection travel time $t_r(\bar{x}_r(\bar{p});\bar{s},\bar{r})$ is different from the diffraction travel time $t_d(\bar{x};\bar{s},\bar{r})$, due to the limited band nature of seismic data, the migration of the reflection that took place at $\bar{x}$ can constructively contribute to the image of the reflector with a dip along $\bar{x}$.

The selection between illuminating migration contributions (constructive interference) and non-illuminating migration contributions (destructive interference) is made using the increment function $i(t_d,t_r;\bar{s},\bar{r})$.

According to one embodiment of the invention, the increment function is expressed according to $i(t_d,t_r;\bar{s},\bar{r})=s(t_d(\bar{x};\bar{s},\bar{r})-t_r(\bar{x}_r(\bar{p});\bar{s},\bar{r}))$ where:
- s(t) is a seismic wavelet which may be monochromatic, with limited band or infinite band and it can be chosen to be dependent on time and space,
- ṡ(t) is the derivative with respect to time of the seismic wavelet $\dot{s}(t)=d[s(t)]/dt$.

A derivative with respect to time is usually applied to each seismic trace before the Kirchhoff migration (in time or in depth). Thus, particularly in order to make the studied quantities uniform, the derivative ṡ(t) of the seismic wavelet with respect to time is chosen instead of using the seismic wavelets s(t) itself.

According to another embodiment of the invention, particularly when the derivatives of seismic traces with respect to time are not determined, the increment function takes account of the seismic wavelet s(t) instead of the derivative ṡ(t) of the wavelet with respect to time; the result is then $i(t_d,t_r;\bar{s},\bar{r})=s(t_d(\bar{x};\bar{s},\bar{r})-t_r(\bar{x}_r(\bar{p});\bar{s},\bar{r}))$.

A migration amplitude correction term $w(\bar{x};\bar{s},\bar{r})$ is conventionally calculated during the migration, and in particular takes account of a regular acquisition geometry.

Therefore, this term $w(\bar{x};\bar{s},\bar{r})$ may advantageously be used in the method according to the invention, and act as "preconditioning" to the correction made by determination of the previously described illumination fold.

The increment function may then be weighted by this preconditioning term, such that the illumination fold $I(\bar{x},\bar{p};\bar{s},\bar{r})$ related to a (source $\bar{s}$, receiver $\bar{r}$) pair is incremented by:

$$I(t_d,t_r;\bar{s},\bar{r}) \cdot w(\bar{x};\bar{s},\bar{r}).$$

The evaluation of the illumination fold in the migrated domain according to the invention is optimum since it is applicable to any acquisition geometry.

Based on an inverse approach, the illumination fold $I(\bar{x},\bar{p})$ estimated by the invention agrees with the theoretical results established by Bleistein. This is not the case for other methods proposed to solve a similar problem.

As already mentioned earlier, the evaluation of the illumination fold proposed by the invention uses only basic quantities available for migration conventionally done by a Kirchhoff summation.

Advantageously, the illumination fold according to the invention may be estimated while seismic traces are being migrated.

This is not the case for some other proposed methods (Schneider et al., Laurain and Vinje) for which the said evaluation is done post-migration.

According to another aspect, the invention also proposes a method for correction of the amplitudes of seismic data recorded during 3D seismic prospecting in order to compensate for the effect of non-uniform illumination of subsoil reflectors, characterized in that it comprises steps consisting of:
- estimating the illumination fold $I(\bar{x},\bar{p})$ by the method according to the first aspect of the invention described in detail above,
- using the inverse $I^{-1}(\bar{x},\bar{p})$ of the said ratio as the weighing factor to be applied to each of the said seismic data amplitudes.

According to yet another aspect, the invention also proposes a method for selection of one of a plurality of acquisition geometries as a function of the target of 3D seismic prospecting, characterized in that it comprises steps consisting of:
- for each acquisition geometry considered, determining the illumination fold $I(\bar{x},\bar{p})$ estimated according to the first aspect of the invention given in detail above,
- selecting the acquisition geometry providing the optimum illumination fold as a function of the target.

Finally, it will be noted that the illumination fold $I(\bar{x},\bar{p})$ estimated according to the first aspect of the invention described in detail above, may also be used after the migration to eliminate acquisition patterns, and to deconvolute the migrated image.

The invention claimed is:

1. Method for estimating the seismic illumination fold $I(\bar{x},\bar{p})$ in the migrated 3D domain at least one image point $\bar{x}$, for at least one dip of vector $\bar{p}$, wherein the illumination fold $I(\bar{x},\bar{p};\bar{s},\bar{r})$ for each (source $\bar{s}$, receiver $\bar{r}$) pair in the seismic survey is estimated, by applying the following steps:
- determination of the reflection travel time $t_r(\bar{x}_r(\bar{p});\bar{s},\bar{r})$ from the source $\bar{s}$ to the specular reflection point $\bar{x}_r$ on the plane reflector passing through the image point $\bar{x}$ and perpendicular to the dip vector $\bar{p}$ and then returning to the reflector $\bar{r}$;

starting from the diffraction travel time $t_d(\bar{x};\bar{s},\bar{r})$ from the source $\bar{s}$ to the said image point $\bar{x}$ and then returning to the reflector $\bar{r}$;

incrementing the said illumination fold $I(\bar{x},\bar{p};\bar{s},\bar{r})$ related to the said (source $\bar{s}$, receiver $\bar{r}$) pair as a function of the difference between the diffraction travel time $t_d(\bar{x};\bar{s},\bar{r})$ and the reflection travel time $t_r(\bar{x}_r(\bar{p});\bar{s},\bar{r})$.

2. Method according to claim 1, comprising the step of summating each of the said illumination folds $I(\bar{x},\bar{p};\bar{s},\bar{r})$ related to a (source $\bar{s}$, receiver $\bar{r}$) pair so as to determine the total illumination fold $$I(\bar{x}, \bar{p}) = \sum_{sp} I(\bar{x}, \bar{p}; \bar{s}, \bar{r}).$$

3. Method according to claim 1, wherein, during the incrementing step, the illumination fold $I(\bar{x},\bar{p};\bar{s},\bar{r})$ is incremented using an increment function $i(t_d,t_r;\bar{s},\bar{r})$ according to $I(\bar{x},\bar{p}) = I(\bar{x},\bar{p}) + i(t_d,t_r;\bar{s},\bar{r})$, the said increment function taking account of the difference between the diffraction travel time $t_d(\bar{x};\bar{s},\bar{r})$ and the reflection travel time $t_r(\bar{x}_r(\bar{p});\bar{s},\bar{r})$.

4. Method according to claim 3, wherein the increment function i is a function of the seismic wavelet $s(t)$.

5. Method according to claim 4, wherein the increment function i is expressed as a function of the derivative of the seismic wavelet $s(t)$ according to:

$$i(t_d,t_r;\bar{s},\bar{r}) = s(t_d(\bar{x};\bar{s},\bar{r}) - t_r(\bar{x}_r(\bar{p});\bar{s},\bar{r})).$$

6. Method according to claim 4, wherein the increment function i is expressed as a function of the derivative $\dot{s}(t)$ of the seismic wavelet $s(t)$ with respect to time according to:

$$i(t_d,t_r;\bar{s},\bar{r}) = \dot{s}(t_d(\bar{x};\bar{s},\bar{r}) - t_r(\bar{x}_r(\bar{p});\bar{s},\bar{r})).$$

7. Method according to any one of claims 3 to 6, in which an a priori correction $w(\bar{x},\bar{s},\bar{r})$ of the illumination fold is taken into account by migration, comprising the step of incrementing the illumination fold $I(\bar{x},\bar{p};\bar{s},\bar{r})$ related to a (source $\bar{s}$, receiver $\bar{r}$) pair by $i(t_d,t_r;\bar{s},\bar{r}) \cdot w(\bar{x};\bar{s},\bar{r})$.

8. Method according to claim 1, wherein the determination step includes the second order Taylor series development of the diffraction travel time $t_d(\bar{x};\bar{s},\bar{r})$ around the image point $\bar{x}$:

$$t_d(\bar{x};\bar{s},\bar{r}) = t_d(\bar{x};\bar{s},\bar{r}) + (\nabla_x t_d(\bar{x};\bar{s},\bar{r}))^T \cdot (\bar{x}_r - \bar{x}) + \frac{1}{2}(\bar{x}_r - \bar{x})^T \cdot \Delta_{x,x} t_d(\bar{x};\bar{s},\bar{r}) \cdot (\bar{x}_r - \bar{x}).$$

9. Method according to claim 8, wherein the specular reflection point $\bar{x}_r(\bar{p})$ is determined along the length of the said reflector such that the diffraction travel time at the said specular reflection point $\bar{x}_r(\bar{p})$ is stationary, according to the equation:

$$\bar{p}^T \Lambda (\nabla_x t_d(\bar{x};\bar{s},\bar{r}) + (\Delta_{x,x} t_d(\bar{x};\bar{s},\bar{r}) \cdot (\bar{x}_r(\bar{p}) - \bar{x})) = \bar{0}.$$

10. Method according to claim 8, wherein the specular reflection point $\bar{x}_r$ and the reflection travel time $t_r(\bar{x}_r(\bar{p});\bar{s},\bar{r})$ are determined according to the following expressions:

$$\bar{x}_r(\bar{p}) = \bar{x} - M \cdot F^{-1} \cdot \bar{b}$$

$$t_r(\bar{x}_r(\bar{p});\bar{s},\bar{r}) = t_d(\bar{x};\bar{s},\bar{r}) - 1/2 \cdot \bar{b}^T \cdot F^{-1} \cdot \bar{b}$$

where:

M is a (3×2) matrix described by two vectors extending along the length of the reflector, and therefore perpendicular to the dip vector $\bar{p}$;

$\bar{b}$ is a (2×1) vector of first order derivatives of the diffraction travel time along the reflection plane: $\bar{b} = M^T \cdot (\nabla_x t_d)$;

F is a (2×2) matrix of second order derivatives of the diffraction travel time along the reflection plane: $F = M^T \cdot (\Delta_{x,x} t_d) \cdot M$.

11. Method according to claim 10, wherein the determination step uses isochronic migration maps $t_d(\bar{x};\bar{s},\bar{r})$ specified for each (source $\bar{s}$, receiver $\bar{r}$) pair involved in the migration at each image point $\bar{x}$ in the migrated 3D domain.

12. Method according to any one of the preceding claims, wherein the seismic illumination fold $I(\bar{x},\bar{p})$ in the migrated 3D domain is estimated during the Kirchoff summation migration of seismic data recorded during the 3D seismic prospecting.

13. Method for correction of seismic data amplitudes recorded during 3D seismic prospecting in order to compensate for the effect of non-uniform illumination of sub soil reflectors, comprising the steps of:

estimating the illumination fold $I(\bar{x},\bar{p})$ using the method according to claim 1, using the inverse $I^{-1}(\bar{x},\bar{p})$ of the said ratio as a weighting factor to be applied to each of the said seismic data amplitudes.

14. Method for selection of an acquisition geometry among a plurality of acquisition geometries as a function of the target of 3D seismic prospecting, comprising the steps of:

determining the illumination fold $I(\bar{x},\bar{p})$ by the method according to claim 1, for each of the acquisition geometries considered, selecting the acquisition geometry providing the optimum illumination fold as a function of the target.

15. Method according to claim 2, wherein, during the incrementing step, the illumination fold $I(\bar{x},\bar{p};\bar{s},\bar{r})$ is incremented using an increment function $i(t_d,t_r;\bar{s},\bar{r})$ according to $I(\bar{x},\bar{p}) = I(\bar{x},\bar{p}) + i(t_d,t_r;\bar{s},\bar{r})$, the said increment function taking account of the difference between the diffraction travel time $t_d(\bar{x};\bar{s},\bar{r})$ and the reflection travel time $t_r(\bar{x}_r(\bar{p});\bar{s},\bar{r})$.

16. Method according to claim 15, in which an a priori correction $w(\bar{x},\bar{s},\bar{r})$ of the illumination fold is taken into account by migration, comprising the step of incrementing the illumination fold $I(\bar{x},\bar{p};\bar{s},\bar{r})$ related to a (source $\bar{s}$, receiver $\bar{r}$) pair by $i(t_d,t_r;\bar{s},\bar{r}) \cdot w(\bar{x};\bar{s},\bar{r})$.

17. Method according to claim 16, wherein the determination step includes the second order Taylor series development of the diffraction travel time (x; s, r) around the image point x:

$$t_d(\bar{x};\bar{s},\bar{r}) = t_d(\bar{x};\bar{s},\bar{r}) + (\nabla_x t_d(\bar{x};\bar{s},\bar{r}))^T \cdot (\bar{x}_r - \bar{x}) + \frac{1}{2}(\bar{x}_r - \bar{x})^T \cdot \Delta_{x,x} t_d(\bar{x};\bar{s},\bar{r}) \cdot (\bar{x}_r - \bar{x})$$

18. Method according to claim 17, wherein the specular reflection point $\bar{x}_r(\bar{p})$ is determined along the length of the said reflector such that the diffraction travel time at the said specular reflection point $\bar{x}_r(\bar{p})$ is stationary, according to the equation:

$$\bar{p}^T \Lambda(\nabla_x t_d(\bar{x};\bar{s},\bar{r}) + (\Delta_{x,x} t_d(\bar{x};\bar{s},\bar{r}) \cdot (\bar{x}_r(\bar{p}) - \bar{x})) = \bar{0}.$$

19. Method according to claim 18, wherein the specular reflection point $\bar{x}_r$ and the reflection travel time $t_r(\bar{x}_r(\bar{p});\bar{s},\bar{r})$ are determined according to the following expressions:

$$\bar{x}_r(\bar{p}) = \bar{x} - M \cdot F^{-1} \cdot \bar{b}$$

$$t_r(\bar{x}_r(\bar{p});\bar{s},\bar{r}) = t_d(\bar{x};\bar{s},\bar{r}) - \frac{1}{2} \cdot \bar{b}^T \cdot F^{-1} \cdot \bar{b}$$

where:

M is a (3×2) matrix described by two vectors extending along the length of the reflector, and therefore perpendicular to the dip vector $\bar{p}$;

$\bar{b}$ is a (2×1) vector of first order derivatives of the diffraction travel time along the reflection plane: $\bar{b}=M^T \cdot (\bar{b}=M^T \cdot (\nabla_x t_d)$;

F is a (2×2) matrix of second order derivatives of the diffraction travel time along the reflection plane: $F=M^T \cdot (\Delta_{x,x} t_d) \cdot M$.

20. Method according to claim 19, wherein the determination step uses isochronic migration maps $t_d(\bar{x};\bar{s},\bar{r})$ specified for each (source $\bar{s}$, receiver $\bar{r}$) pair involved in the migration at each image point $\bar{x}$ in the migrated 3D domain.

21. Method according to claim 20, wherein the seismic illumination fold $I(\bar{x},\bar{p})$ in the migrated 3D domain is estimated during the Kirchoff summation migration of seismic data recorded during the 3D seismic prospecting.

* * * * *